United States Patent
Alnås

(10) Patent No.: US 12,193,112 B2
(45) Date of Patent: Jan. 7, 2025

(54) METHOD FOR IDENTIFYING TERMINAL CAPABILITIES IN A WIRELESS COMMUNICATION SYSTEM

(71) Applicant: SONY CORPORATION, Tokyo (JP)

(72) Inventor: Svante Alnås, Lund (SE)

(73) Assignee: Sony Corporation, Tokyo (JP)

( * ) Notice: Subject to any disclaimer, the term of this patent is extended or adjusted under 35 U.S.C. 154(b) by 300 days.

(21) Appl. No.: 17/263,072

(22) PCT Filed: Sep. 4, 2019

(86) PCT No.: PCT/SE2019/050830
§ 371 (c)(1),
(2) Date: Jan. 25, 2021

(87) PCT Pub. No.: WO2020/071980
PCT Pub. Date: Apr. 9, 2020

(65) Prior Publication Data
US 2021/0297849 A1    Sep. 23, 2021

(30) Foreign Application Priority Data
Oct. 3, 2018 (SE) .................................. 1851189-9

(51) Int. Cl.
H04W 8/24 (2009.01)
H04W 4/12 (2009.01)
H04W 8/18 (2009.01)
(52) U.S. Cl.
CPC .............. *H04W 8/24* (2013.01); *H04W 4/12* (2013.01); *H04W 8/183* (2013.01)

(58) Field of Classification Search
CPC .......... H04W 8/24; H04W 4/12; H04W 8/183
(Continued)

(56) References Cited

U.S. PATENT DOCUMENTS 10,649,753 B2 * 5/2020 Rahman .................... G06F 8/61
10,757,566 B2 * 8/2020 He .......................... H04W 8/24
(Continued)

FOREIGN PATENT DOCUMENTS

CN     105548960 A     5/2016
CN     107534987 A     1/2018
(Continued)

OTHER PUBLICATIONS

International Search Report and Written Opinion from corresponding International Patent Application No. PCT/SE2019/050830, mailed Nov. 21, 2019, 11 pages.
(Continued)

*Primary Examiner* — Congvan Tran
(74) *Attorney, Agent, or Firm* — Tucker Ellis LLP

(57) ABSTRACT

Devices and methods in a wireless communication system (40) applicable to UE (1), an access node (20) and a core network node (120), for handling UE capability information. For the UE, the method comprises storing (602) the UE capabilities information (50) divided into a plurality of data blocks (51-54), wherein each data block includes a subset of the UE capability information; determining (603), for each data block, a corresponding capability ID (512,522,532, 542); transmitting a capability message (61) to the access network (200), comprising at least one of the determined capability IDs.

20 Claims, 5 Drawing Sheets

(58) Field of Classification Search
USPC .................................................. 370/328–329
See application file for complete search history.

(56) References Cited

U.S. PATENT DOCUMENTS

| | | | |
|---|---|---|---|
| 2008/0040417 A1* | 2/2008 | Juncker | H04L 67/303 709/201 |
| 2009/0011783 A1* | 1/2009 | Kitazoe | H04W 8/22 455/517 |
| 2014/0098756 A1 | 4/2014 | Tabatabaei | |
| 2014/0362748 A1* | 12/2014 | Barany | H04L 5/0092 370/281 |
| 2015/0149500 A1 | 5/2015 | Cowling | |
| 2015/0350418 A1* | 12/2015 | Rauenbuehler | H04M 1/724 455/414.1 |
| 2016/0044087 A1* | 2/2016 | Velummylum | H04L 67/306 726/4 |
| 2017/0169401 A1* | 6/2017 | Beane | H04W 24/00 |
| 2017/0318463 A1* | 11/2017 | Lee | H04W 12/0433 |
| 2017/0337242 A1* | 11/2017 | Hu | H04L 67/12 |
| 2018/0084539 A1* | 3/2018 | Kubota | H04W 72/51 |
| 2018/0227904 A1* | 8/2018 | Raghunathan | H04W 72/51 |
| 2018/0262905 A1* | 9/2018 | Dhanapal | H04W 8/24 |
| 2019/0044984 A1* | 2/2019 | Chiang | H04L 65/1016 |
| 2019/0110190 A1* | 4/2019 | Van Lieshout | H04W 76/27 |
| 2020/0029377 A1* | 1/2020 | Chow | H04W 76/15 |
| 2020/0213836 A1* | 7/2020 | Kim | H04W 8/24 |
| 2020/0260264 A1* | 8/2020 | Hapsari | H04W 88/06 |
| 2021/0029618 A1* | 1/2021 | Jain | H04W 48/16 |
| 2021/0168799 A1* | 6/2021 | Xu | H04W 72/0446 |
| 2021/0329444 A1* | 10/2021 | Wiemann | H04W 8/24 |

FOREIGN PATENT DOCUMENTS

| | | |
|---|---|---|
| CN | 108605281 A | 9/2018 |
| CN | 108616346 A | 10/2018 |
| WO | 2017052346 A1 | 3/2017 |

OTHER PUBLICATIONS

3GPP, "3rd Generation Partnership Project: Technical Specification Group Services and System Aspects; Study on Optimisations of UE Radio Capability Signalling (Release 16)", 3GPP TR 23.743 V0.2.0, Aug. 2018, 32 pages.

Samsung, "Use of Identifier Representing NR UE Capabilities, Baseline", 3GPP TSG-RAN WG2 meeting #101 bis, R2-180 5613 (Revision of R2-1803097), Apr. 16-20, 2018, 5 pages.

Deutsche Telekom et al., "Hashed UE Capability Information as Unique UE Capability Identity", 3GPP TSG RAN2#103bis, R2-181 4927, Oct. 8-12, 2018, 3 pages.

3GPP, "3rd Generation Partnership Project: Technical Specification Group Services and System Aspects; Study on Optimisations of UE Radio Capability Signalling (Release 16)", 3GPP TR 23.743 V16. 0.0, Mar. 2019, 56 pages.

Swedish Office Action and Swedish Search Report from corresponding Swedish Application No. 1851189-9, mailed on May 6, 2019, 8 pages.

Deutsche Telekom, "Solution Using Hash-Based Identification of UE Radio Capabilities", 3GPP SA WG2 Meeting #128, S2-186432, Jul. 2-6, 2018, 3 pages.

* cited by examiner

METHOD FOR IDENTIFYING TERMINAL CAPABILITIES IN A WIRELESS COMMUNICATION SYSTEM

TECHNICAL FIELD

This disclosure relates to methods and devices for handling capabilities of a terminal in a wireless communication system. More specifically, solutions are provided for identification and transmission of capabilities between various entities within the wireless system.

BACKGROUND

In wireless communication systems, such as various generations provided through the 3rd Generation Partnership Project (3GPP), various generations of specifications have been provided for setting up common rules for setting up and operating both a wireless radio interface between a wireless terminal and a base station, and various levels of operation of the wireless network. In 3GPP documentation, a wireless terminal, or wireless communication device, is commonly referred to as a User Equipment (UE). A base station defines a cell and is operative to serve a surrounding area with radio access for UEs, by providing radio access to UEs within a cell. A base station is also referred to herein as a node or access node, and various terms are used in 3GPP for different types of systems or specification. An access network, or Radio Access Network (RAN), typically includes a plurality of access nodes, and is connected to a Core Network (CN) which inter alia provides access to other communication networks. In the so-called 3G specifications, also referred to as the Universal Mobile Telecommunications System (UMTS), the term NodeB is used to denote an access node, whereas in the so-called 4G specifications, also referred to as Long-Term Evolution (LTE), the term eNodeB (eNB) is used. A further developed set of specifications for radio communication are referred to as the 5G type radio communication system (5GS), including the New Radio (NR) technology, wherein the term gNB is used to denote an access node.

UEs can have many different capabilities, such as radio capabilities, e.g., associated with modem properties or supported functionality in the UE. In order to make various entities of the wireless network aware of the capabilities supported by a certain UE, the UE indicates its capabilities to the wireless network. This is typically accomplished when the UE registers with the wireless communication network. The capabilities can be indicated in different formats, e.g., in terms of parameters or indicators listed in one or more information elements of a message.

In general, the UE may indicate multiple different capabilities, which may for example concern the support of different modulation and demodulation formats, maximum data demodulation rate, 3GPP release version, frequency band support, or specific functions such as relaying or the support of device-to-device communication. In the existing technology, the UE capabilities are indicated in a rather static manner to the network. The capabilities may be indicated upon initial network registration and in some handover scenarios, in response to the network sending a UE capability enquiry. For initiating an update of the capability information from the UE side, the UE may need to re-register in the network.

With the increasing amount of UEs operating in the wireless networks, and the concurrently increasing number of supportable services, features, radio frequency bands etc., the data size of the UE capabilities continues to grow. Current 3GPP releases already have problems with the size of the capabilities. Studies approved within 3GPP to investigate ways of improvement have suggested allocating static capabilities ID per vendor & model or hash for the complete set of capabilities. However, these solutions may be deemed to be too static and inconvenient when part of the capability is changed. It is furthermore unrealistic that it will be possible to conveniently store the standardize the UE capability in a central database owned by the operators or manufactures together.

Accordingly, there is a need for techniques that allow for efficiently indicating supported capabilities of a UE or similar wireless communication device to the wireless communication network.

SUMMARY

A general object is to provide improved solutions for handling UE capability information in a wireless communication system. This includes identification, storing and transmission of such UE capability information. This is provided by means of the solutions laid out in the independent claims. Further advantageous embodiments are laid out in the dependent claims.

According to a first aspect, a method is provided for use in a user equipment, UE, for handling UE capability information in a wireless communication system including an access network, comprising
- storing the UE capabilities information divided into a plurality of data blocks, wherein each data block includes a subset of the UE capability information;
- determining, for each data block, a corresponding capability ID;
- transmitting a capability message to the access network, comprising at least one of the determined capability IDs.

This way, the amount of data to transmit for handling UE capability information in the wireless communication system may be limited.

In one embodiment, each capability ID is determined based on the data of the associated data block.

In one embodiment, each capability ID is a hash value calculated using a predetermined function based on the data of the associated data block.

In one embodiment, each block has a predetermined common maximum data size.

In one embodiment, each block has data size not exceeding a predetermined number of octets.

In one embodiment, said capability message comprises the capability ID associated with each data block.

In one embodiment, the method comprises
- receiving a capability request message from an access node of the access network, identifying at least one of said data blocks;
- transmitting data blocks corresponding to the capability IDs identified by said capability request message to the access node in response to receiving the capability request message.

In one embodiment, each data block is transmitted in a separate message to the access node.

In one embodiment, at least one of said data blocks includes UE radio capabilities associated with a predetermined radio frequency.

In one embodiment, at least one of said data blocks includes UE radio capabilities associated with a predetermined feature set of radio communication.

In one embodiment, each capability ID is determined based on a device manufacturer specific code.

In accordance with a second aspect, a method is provided for use in an access node for handling user equipment, UE, capability information in an access network of a wireless communication system including at least one UE, comprising receiving, from said UE, a capability message comprising one or more capability IDs, wherein each capability ID is associated with a corresponding data block that represents a subset of the UE capability information of said UE.

In one embodiment, the method comprises
determining availability of the UE capability information corresponding to the received capability IDs;
transmitting a capability request message to a node in the wireless communication system, identifying the capability ID associated with at least one data block which is not available to the access node;
receiving said at least one data block from said node.

In one embodiment, the method comprises
validating the at least one data block by
calculating a capability ID based on each at least one received data block using a predetermined function for calculating capability IDs;
comparing the calculated capability ID with the received capability ID of the capability message.

In one embodiment, said node is a core network node of the wireless communication system.

In one embodiment, said node is the UE.

In one embodiment, transmitting the capability request message includes
transmitting a first capability request message to a core network node of the wireless communication system; and, responsive to not receiving said at least one data block from the core network node,
transmitting a second capability request message to the UE.

In one embodiment, the method comprises
transmitting said at least one data block to a core network node of the wireless communication system.

In one embodiment, each capability ID is determined based on the data of the associated data block.

In one embodiment, each capability ID is a hash value calculated using a predetermined function based on the data of the associated data block.

In one embodiment, each block has a predetermined common maximum data size.

In one embodiment, each block has data size not exceeding a predetermined number of octets.

In one embodiment, said capability message comprises the capability ID associated with each data block.

According to a third aspect, a method is provided for use in a core network node for handling user equipment, UE, capability information in a wireless communication system including at least one UE and an access network, comprising receiving, from an access node of the access network, a capability request message comprising one or more capability IDs, wherein each capability ID is associated with a corresponding data block including a subset of the UE capability information of said UE.

In one embodiment, the method comprises
determining availability of the UE capability information corresponding to the received capability IDs;
transmitting all available data blocks corresponding to the received capability IDs to the access node.

In one embodiment, the method comprises
receiving, from the access node, all previously not available data blocks corresponding to the received capability IDs, and
storing the received data blocks.

According to a fourth aspect, a user equipment is provided, configured to communicate with an access node in a wireless communication system, comprising
a logic configured to execute the computer program code to control the user equipment to carry out any of the aforementioned steps.

According to a fifth aspect, an access node is provided for handling user equipment, UE, capability information in an access network of a wireless communication system including at least one UE, comprising
a logic configured to execute the computer program code to control the access node to carry out any of the aforementioned steps.

According to a sixth aspect, a core network node is provided for handling user equipment, UE, capability information in a wireless communication system including at least one UE and an access network, comprising
a logic configured to execute the computer program code to control the access node to carry out any of the aforementioned steps.

According to a seventh aspect, a method is provided for use in a UE for handling UE capability information in a wireless communication system including an access network, comprising
storing the UE capability information divided into a plurality of data blocks, wherein each data block includes a subset of the UE capability information;
transmitting at least one of said data blocks to the access network, wherein each data block is transmitted in a separate message.

It should be understood that the embodiments and examples outlined herein may conveniently be combined, except were clearly presented as alternatives.

BRIEF DESCRIPTION OF THE DRAWINGS

Various embodiments will be described with reference to the drawings, in which.

DETAILED DESCRIPTION OF EMBODIMENTS

The invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Figure 1:
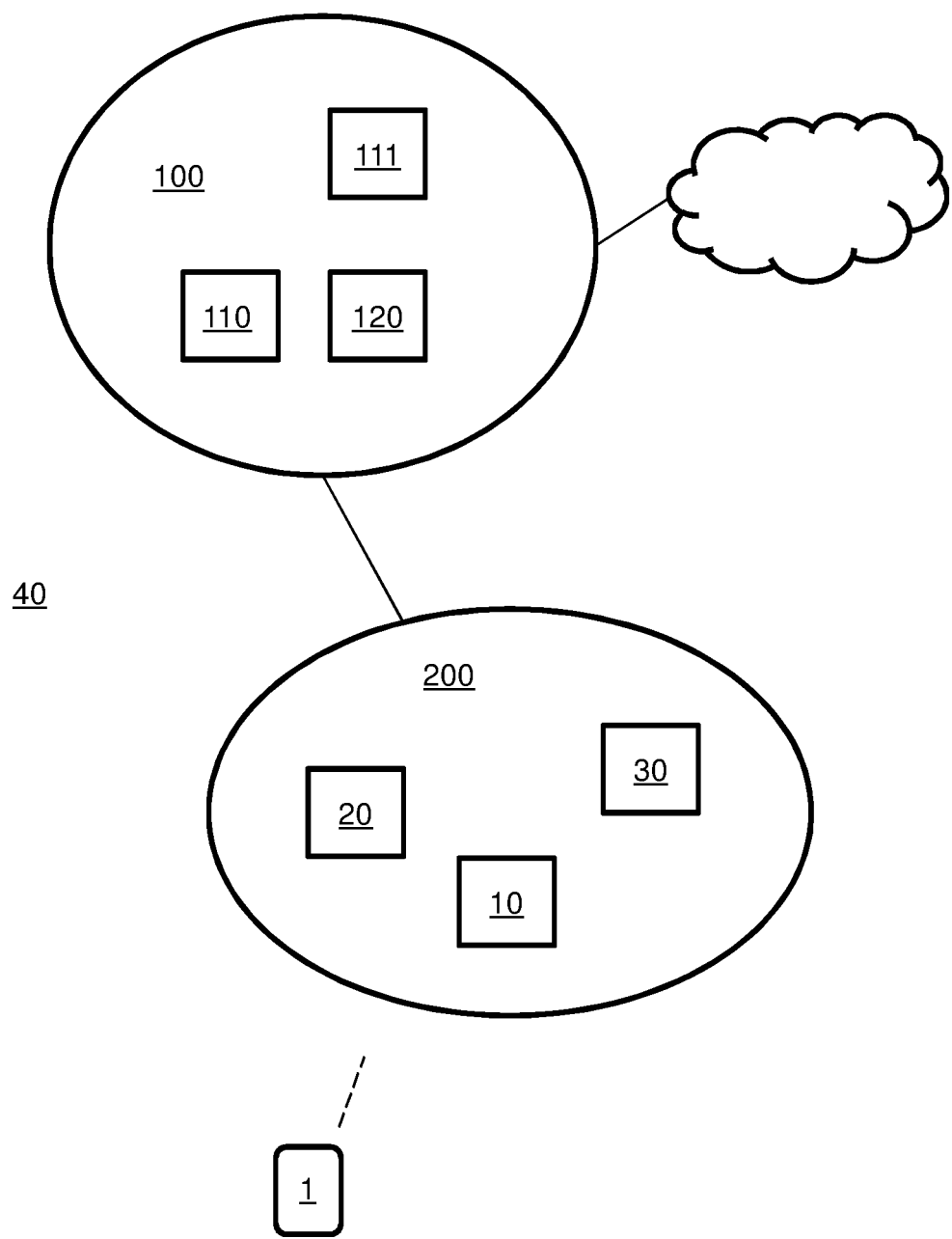
FIG. 1 schematically illustrates a wireless communication network system including networks and nodes according to various embodiments.

FIG. 1 schematically illustrates a wireless communication system 40, including an access network 200. The access network 200 is in turn connected to a core network 100, which provides access to other communication networks, such as the Internet. The access network 200 may include a plurality of access nodes 10, 20, 30 configured to serve various cells. The access network 200 may e.g. be a RAN. A UE 1 is a wireless device configured to communicate wirelessly with access nodes of the access network 200, such as by radio. UEs may be stationary or mobile.

Each access node 10, 20, 30 may in various embodiments be referred to as a base station, serving each one cell. The access network 200 may comprise a number of subareas, which may be referred to as RAN Notification Areas (RNA). Each RNA may consist of a number of cells, where each cell is served by one access node 20. One of those cells may be referred to as an anchor cell. The anchor cell includes the access node 20 that has configured interface to the core network 100 for Control plane and User plane, referred to as N2 and N3 interfaces in 5G. Corresponding interfaces S1-C and S1-U are provided in LTE. The access nodes 10, 30 of the other cells of the RNA may be connected to the anchor cell 20 by means of a logical inter-node interface. In 5G, this interface, or set of interfaces, is referred to as Xn interface, and has a similar purpose as the X2 interface defined for LTE.

The CN 100 may include various core network entities in the form of nodes or functions 110, 111, 120, defined in accordance with a certain 3GPP release or in accordance with another set of wireless communication standards. Such CN entities may e.g. include a node 110 for handling mobility of UEs, such as an Access & Mobility management Function (AMF) and Session Management Function (SMF). The CN may further include a User Plane Function UPF 120, and one or more gateways 111, such as one or more of a Serving Gateway and a PDN Gateway.

Figure 2:
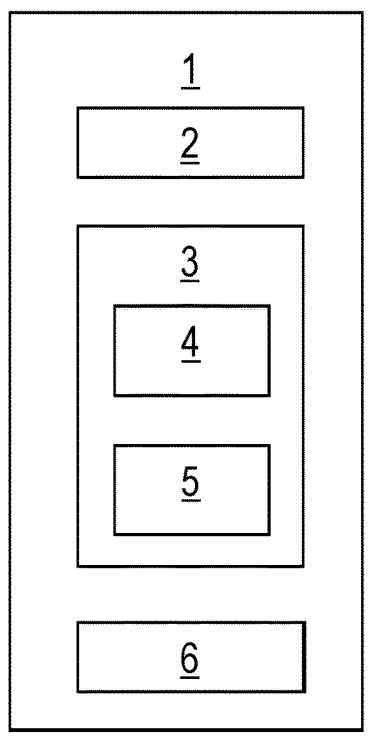
FIG. 2 schematically illustrates elements included in a UE configured in accordance with various embodiments.

FIG. 2 schematically illustrates a UE 1. The UE 1 may be configured for communication with an access network 200, and comprise a transceiver 2, such as a radio receiver and transmitter for communicating with the access network 200 through at least an air interface. The terminal 1 further comprises a logic 3. The logic 3 may comprise for example a controller or microprocessor 4. The logic may also comprise or be connected to a data storage device 5 configured to include a computer readable storage medium. The data storage device 5 may include a memory and may be, for example, one or more of a buffer, a flash memory, a hard drive, a removable media, a volatile memory, a non-volatile memory, a random access memory (RAM), or other suitable device. In a typical arrangement, the data storage device 5 includes a non-volatile memory for long term data storage and a volatile memory that functions as system memory for the controller 4. The data storage device 5 may exchange data with a processor 4 of the logic 3 over a data bus. The data storage device 5 is considered a non-transitory computer readable medium. One or more processors of the logic 3 may execute instructions stored in the data storage device or a separate memory in order to carry out operation of the UE 1, as outlined herein. The UE 1 may further comprise a data memory 6 for storing UE capability information and associated data. The data memory 6 may be or form part of the data storage device 5, or be a separate entity, but is specifically indicated in the drawing to identify the intended difference between storing code associated with a computer program or operating system in data storage 5 used for controlling and operating the UE 1, from capability data which can be accessed and sent to other nodes of the wireless system 40. It may be noted that the UE clearly may include other features and functions than those identified, such as e.g. one or more antennas, a user interface, a power source and so on, but these components are not shown in FIG. 2 for clarity reasons.

Figure 3:
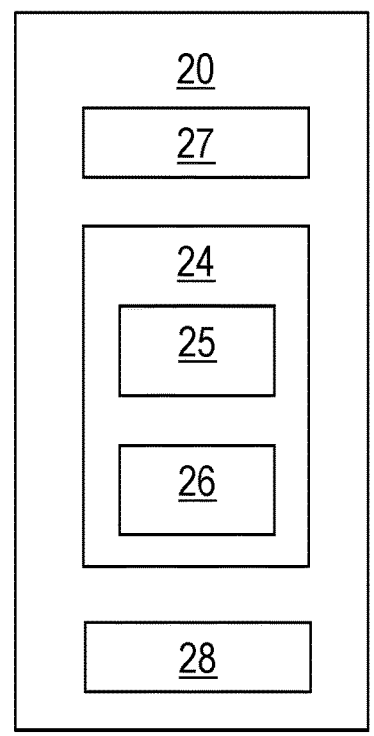
FIG. 3 schematically illustrate elements included in an access node configured in accordance with various embodiments.

FIG. 3 schematically illustrates an access node 20, which comprises an access node logic 24. The access node logic 24 may comprise for example a controller or microprocessor 25. The logic 24 may also comprise or be connected to a data storage device 26 configured to include a computer readable storage medium. The data storage device 26 may include a memory and may be, for example, one or more of a buffer, a flash memory, a hard drive, a removable media, a volatile memory, a non-volatile memory, a random access memory (RAM), or other suitable device. In a typical arrangement, the data storage device 26 includes a non-volatile memory for long term data storage and a volatile memory that functions as system memory for the control unit. The data storage device 26 may exchange data with a processor of the logic 24 over a data bus. The data storage device is considered a non-transitory computer readable medium. One or more processors 25 of the logic 24 may execute instructions stored in the data storage device or a separate memory in order to carry out operation of the access node 20, as outlined herein. The access node 20 may comprise more components, for example a power supply, but these components are not shown in FIG. 3 for clarity reasons. The access node 20 may further comprise one or more transceivers 27 for communication with other entities. For example, the transceiver 27 may comprise a radio transceiver connected to an antenna arrangement (not shown), for communication over an air interface with the UE 1. Moreover, the transceiver 27 may define one or more interfaces to the core network 100. The access node 20 may further comprise a data memory 28 for storing UE capability information and associated data, preferably for a plurality of UEs. The data memory 28 may form part of the data storage device 26 or be a separate entity. Indeed, the data memory 28 may be located centrally accessible for a number of access nodes 20, e.g. in a memory 28 dedicated to several access nodes of an RNA.

Figure 4:
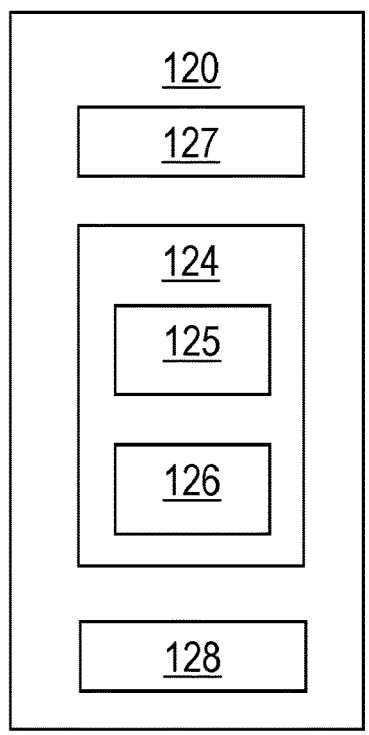
FIG. 4 schematically illustrate elements included in a core network node configured in accordance with various embodiments.

FIG. 4 schematically illustrates a core network (CN) node 120, which comprises a CN node logic 124. The CN node logic 124 may comprise for example a controller or microprocessor 125. The logic 124 may also comprise or be connected to a data storage device 126 configured to include a computer readable storage medium. The data storage device 126 may include a memory and may be, for example, one or more of a buffer, a flash memory, a hard drive, a removable media, a volatile memory, a non-volatile memory, a random access memory (RAM), or other suitable device. In a typical arrangement, the data storage device 126 includes a non-volatile memory for long term data storage and a volatile memory that functions as system memory for the control unit. The data storage device 126 may exchange data with a processor of the logic 124 over a data bus. The data storage device is considered a non-transitory computer readable medium. One or more processors 125 of the logic 124 may execute instructions stored in the data storage device or a separate memory in order to carry out operation of the CN node 120, as outlined herein. The CN node 120 may comprise more components, for example a power supply, but these components are not shown in FIG. 4 for clarity reasons. The CN node 120 may further comprise one or more transceivers 127 for communication with other entities. For example, the transceiver 127 may comprise a transceiver for communication with other networks, e.g. the Internet. Moreover, the transceiver 127 may define one or more interfaces to the access network 200. The CN node 120 may further comprise or be connected to a data memory 128 for storing UE capability information and associated data, preferably for a plurality of UEs. UE capability data of the data memory 128 may physically be stored in a separate memory unit, centrally in the CN 100, whereas the data memory 128 forms a database pointing to or giving access to such separately stored UE capability data.

As noted, a UE 1 may transmit UE capability information, e.g. stored in memory 6, to the access network 200. This may e.g. be accomplished by transmitting a bitmap to indicate its capabilities to the wireless communication network. The receiving access network may store the capability information in data memory 28 and may further convey that data to the CN for central storage in data memory 128. For indicating its capabilities to the wireless communication network, the UE 1 may send a bitmap to an access node 20. This may be accomplished upon initial registration of the UE 1 with the access network 200. However, in some scenarios the bitmap could also be transmitted at a later point of time. For example, the UE 1 could transmit the bitmap while maintaining a connection to the access network 200, e.g., for indicating an update of its capabilities. The bitmap may include a plurality of bits from which subsets of one or more bits indicate whether or not, and optionally also in which way, a certain capability is supported by the UE 1. For example, a single bit of "1" could indicate that the capability is supported. A subset of multiple bits could indicate one of multiple options of supporting a certain capability, a level of support, e.g. distinguishing between no, basic, and full support, and/or one or more parameters related to the capability, e.g. a maximum supported bitrate when using the capability. The mapping of capabilities to bit positions in the bitmap may be preconfigured in the UE 1 and the access node 20. Such pre-configuration may be based on a telecommunication standard and may be based on factory settings or on operator defined settings. Accordingly, the support of a certain capability may be indicated in a binary manner (e.g., by a single bit indicating either "supported" or "unsupported"), but also be indicated by multiple bits, e.g., to indicate a level of support, a selected option, or one or more parameters related to the capability.

The embodiments proposed herein target problems associated with indication of UE capability. Specifically, the amount of data that is transmitted in the wireless communication system, both in the air interface and between the access network 200 and the core network 100, increases rapidly. For one thing, it is expected that the total set of capabilities is too large for current protocol between the UE 1 and the access node 20, and from the access node 20 the core network 100. For these reasons, the current solution is particularly not good when part of the capability is changed, since the entire set of data needs to be retransmitted.

Figure 5:
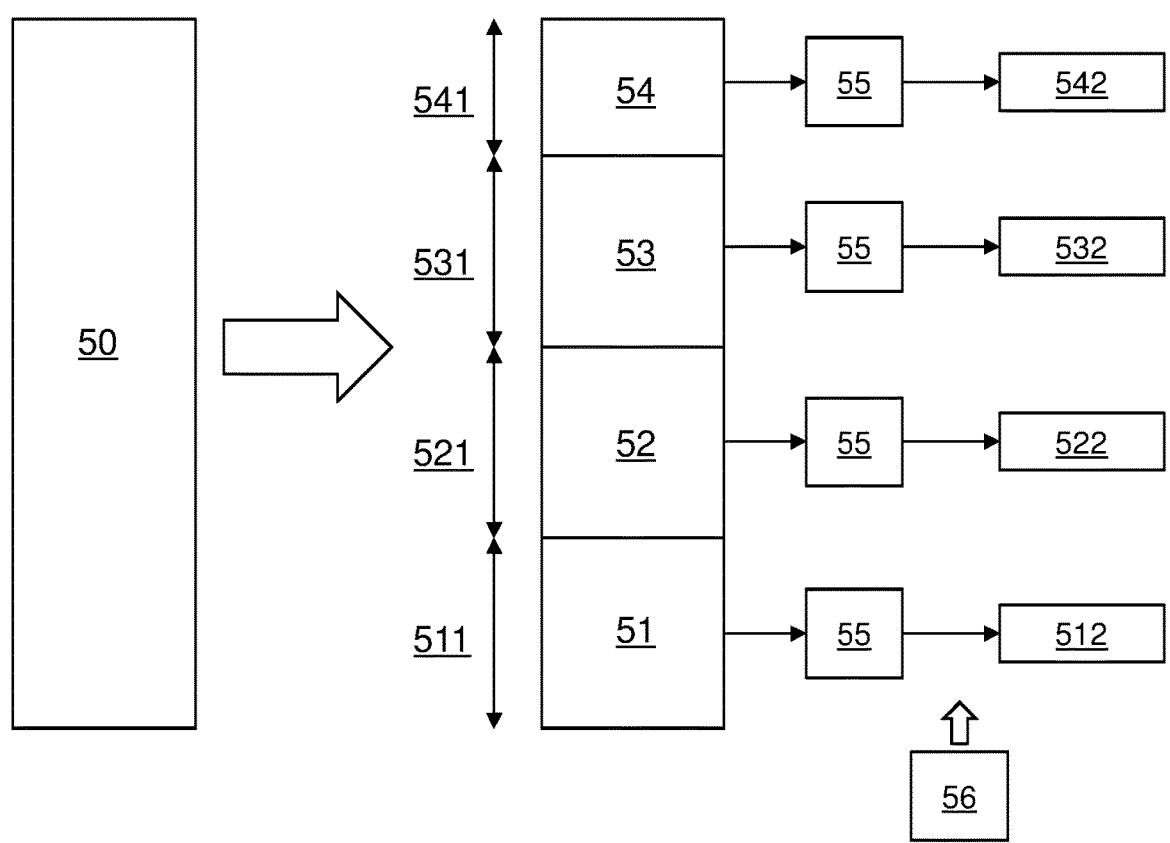
FIG. 5 schematically illustrates configuration of data of UE capability information and calculation of corresponding UE capability IDs, in accordance with various embodiments.

FIG. 5 schematically illustrates a common feature on which the embodiments outlined herein are based. According to this proposal the UE capability information 50 is split into several blocks of data 51-54, wherein each data block includes or represents a subset of the UE capability information. A separate UE capability identity or ID 512, 522, 532, 542 is determined to identify each block of data. Preferably, the UE capability ID 512 for a block of data 51 is determined as a hash 512, calculated using a predetermined hash mechanism 55 based on the data of the block 51. The hash mechanism 55 may e.g. be SHA-2 or SHA-3, where SHA denotes Secure Hash Algorithm. The hash 512 will always have a specific number of bits, e.g. 128 bits, and constitutes a fingerprint of the data 51. Specifically, a device, such an access node 100, may be able to calculate exactly the same hash 512 using the hash mechanism 55, once it has access to the data of block 51. On the other hand, the complexity of the hash function 55 is such that merely having access to the hash 512 and the hash function 55 is not sufficient to reconstruct the data of the data block 51. In various embodiments, the capability ID 512 may be determined based on the data of the corresponding or associated data block 51 with a less complex function than a hash.

In various embodiments, the capability ID is at least partially determined based on a device manufacturer specific code 56. In one embodiment, a hash is calculated from the data of a data block 51, by means of a hash mechanism 55, and subsequently a device manufacturer specific code 56 may be added to the calculated hash, so as to form the capability ID 512.

The division of the UE capability information into blocks is preferably carried out such that each block 51-54 has a data size 511,521,531,541 determined with respect to a predetermined common maximum data size. A UE or modem manufacturer may thus configure a UE model to divide its UE capability information in any particular way, as long as each data block 51-54 does not exceed a maximum size limit. In preferred embodiments, the maximum size limit may be a payload size of a data message format for conveying data in the wireless communication system 40, either between a UE 1 and an access node 20, or between the access network 200 and the core network 100, or in other interfaces within the core network 100. The maximum size limit may in various embodiments be defined as a number of octets, e.g. as defined in Packet Data Convergence Protocol, specified by 3GPP in TS 25.323 for UMTS, TS 36.323 for LTE and TS 38.323 for 5G New Radio NR, or elsewhere. The maximum size limit may e.g. be a predetermined number of bytes, such as 9000 bytes or 8188 bytes.

In various embodiments, a UE may be configured such that UE capability parameters that may vary and be changed even after registration to a wireless network, are collected in one data block 51. This way, once the UE capability information of that or those data blocks 51 are conveyed to and stored in the network, 200, 100, only the UE capability ID 512 needs to be transmitted when the capabilities of a UE 1 are changed. Furthermore, a UE or modem manufacturer may configure its UE capabilities such that capability information of one or several blocks 51-54 are always or often common for several or all UE models. This way, once the UE capability information of that or those data blocks 51 are conveyed to and stored in the network, 200, 100, only the UE capability ID 512 needs to be transmitted from a newly registered UE 1, and the network 100, 200 can still determine the UE capability information of that UE 1. Furthermore, full UE capability information need only be transmitted from the UE 1 for the blocks 51-54 having new information.

In FIG. 5, data blocks 51-53 have substantially the same size, whereas data block 54 is smaller. As noted, this division may be conveniently made, so as to minimize data transmission in the wireless communication system. In fact, one or more data blocks may be considerably smaller than others, where it is deemed that this or these blocks contain UE capability information that is generally different between UE models or individual UEs, or relates to UE capability information that may often change, such as UE capability information associated with category reduction due to overheating.

Figure 6:
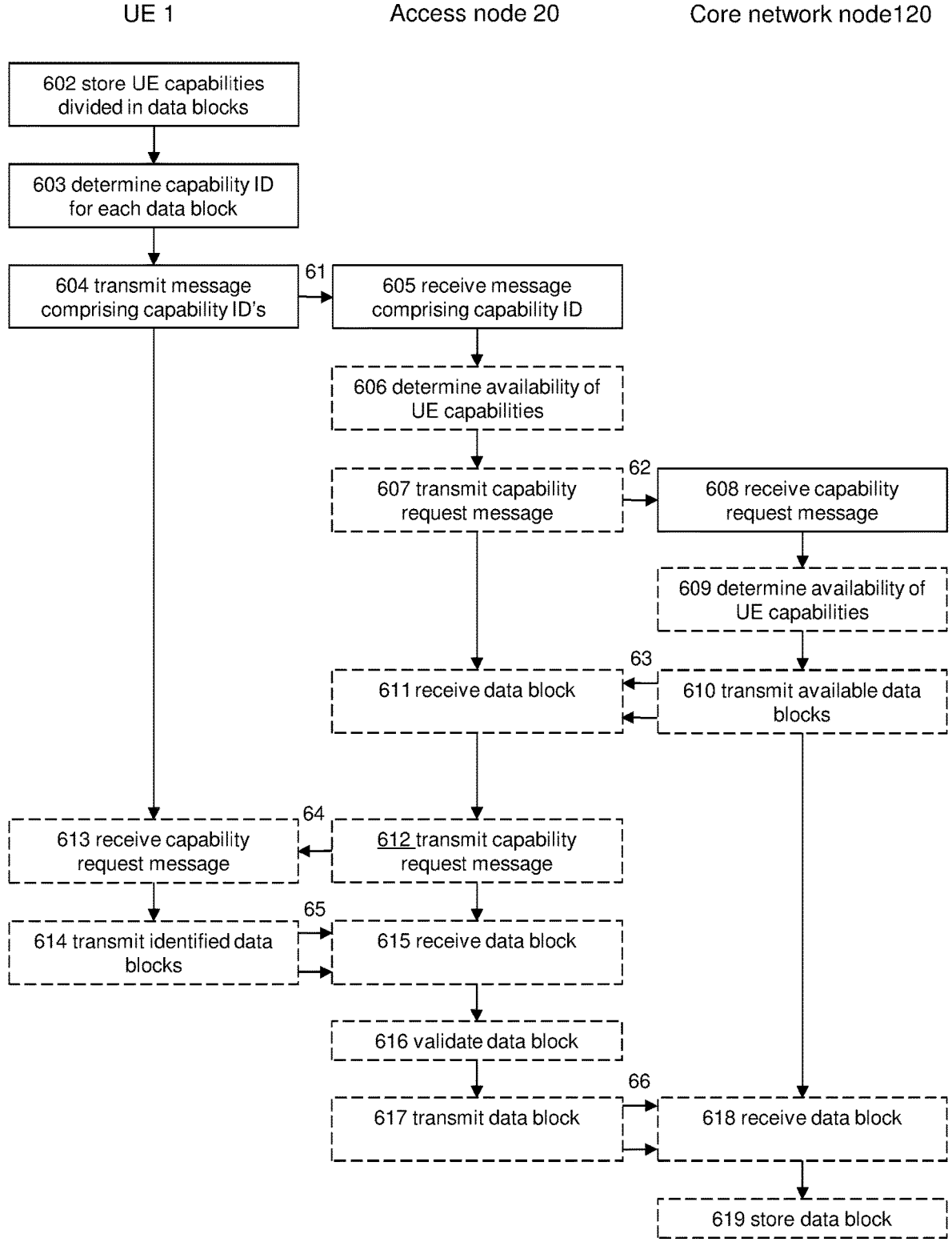
FIG. 6 shows a flow chart including several method steps carried out in various nodes in a wireless communication system, where different steps may be included in different embodiments as outlined in further detail below.

FIG. 6 shows a flow chart, which shows several method steps carried out by entities cooperating in the wireless communication system 40. Moreover, it shall be noted that, while a large number of method steps and messages are indicated, not all those steps and messages need to be included in every embodiment. However, for the sake of convenience, a number of different embodiments will be outlined below with reference to FIG. 6. At least the steps indicated by dashed lines may be optional and included only in certain embodiments.

In the drawing, steps carried out by the UE 1 are shown to the left. These steps may be carried out by means of a UE in accordance with FIG. 2.

Steps carried out in the access network 200 are shown in the middle of the flow chart. These steps may be carried out by means of an access node in accordance with FIG. 3. In FIG. 6, these are exemplified as being carried out by an access node 20. However, it should be clear that various steps of the access network 200 may be carried out by different access nodes 10, 20, 30. A UE 1 may e.g. register to the access network 200 using a first access node 20, and subsequently send updated capability information, or UE capability ID, to the access network 200 through a second access node 30 at a later stage. Also, UE capability information and UE capability ID may be stored in one access node 20 and accessed by another access node 10 of the same access network 200.

Steps carried out in the core network 100 are shown to the right. These steps may be carried out by means of a core network node in accordance with FIG. 4. In FIG. 6, these are exemplified as being carried out in a core network node 120 configured to handle mobility management, such as an AMF of a 5G network. However, steps carried out in the core network 100 may in fact be carried in other or several core network nodes.

With reference to FIG. 6, a method is provided for use in a UE 1 of handling UE capability information in a wireless communication system 40 including an access network 200.

In step 602 the UE stores the UE capabilities information 50 divided into a plurality of data blocks 51-54, wherein each data block includes a subset of the UE capability information. The storing may be provided by the manufacturer of the UE 1, or of a modem in the UE 1. Alternatively, or additionally, various UE capability information may be determined by an operator of the access network 200 and assessed by the UE 1 through access to data on a SIM Subscriber Identity Module such as a UICC Universal Integrated Circuit Card. The actual division into blocks 51-54, of the UE capability information, may in various embodiments be determined by the UE manufacturer.

In various embodiments, each data block, or at least one of the data blocks 51-54, includes UE radio capabilities associated with a predetermined radio frequency. Various embodiment may thus include e.g. three groups of subsets of UE capability information, divided into three blocks 51-53 with capability associated with frequencies 6 GHZ, 28 GHz and 36 GHz, respectively.

In some embodiments, each data block, or at least one of the data blocks 51-54, includes UE radio capabilities associated with a predetermined feature set of radio communication. In such embodiments, groups of subsets of UE capability information may be divided into blocks with respective capability information associated with e.g. VOLTE Voice over LTE, IoT Internet of Things, URLLC Ultra-Reliable Low-Latency Communication etc.

In step 603, the UE 1 determines, for each data block, a corresponding capability ID 512,522,532,542. Each capability ID preferably uniquely corresponds to each one data block. Each capability ID 512 is therefore preferably determined based on the data of the associated data block 51, such as a hash or hash value 512 calculated using a predetermined function 55 based on the data of the associated data block 51. In various embodiments, the UE 1 may have a predefined set of UE capabilities, determined by the UE capability information 50, and may have one or more pre-configured data blocks, such as all or only a subset of the blocks 51-54. In addition, the UE 1 may be preconfigured with predetermined capability IDs for each of the pre-configured data blocks. In such an embodiment, the step of determining a corresponding capability ID may comprise accessing the pre-configured capability ID from a memory 6, rather than calculating it.

In step 604, the UE 1 transmits a capability message 61 to the access network 200, comprising at least one of the determined capability IDs, such as all the determined capability IDs. At original registering to the wireless network, preferably the capability IDs 512, 522, 532, 542 corresponding to each data block 51-54 are preferably transmitted. At later update of UE capabilities, only the determined capability IDs of the data blocks that have been changed need to be transmitted. In various embodiments, all determined capability ID available in the UE 1 are always transmitted, whether any capability ID is changed or not, upon registering to a network 200 or upon request by the network 200.

Preferably, each block 51-54 has a predetermined common maximum data size, which may be determined by specification. The maximum data size may be defined by means of a number of bytes or octets, or by reference to another data object or object size. In various embodiments, the maximum data size may be equal to or correlated with a payload size of a defined data message used in the wireless system 40, as exemplified above.

In step 613, the UE 1 may receive 613 a capability request message 64 from an access node 20 of the access network, identifying at least one of said data blocks. In various embodiments, the capability request message 64 comprises on or more the capability IDs that were transmitted in the capability message 61. In an alternative embodiment, an even simpler identification may be made, such as an identification of the data block order. Where the UE 1 has transmitted e.g. four capability IDSs 512, 522, 532, 542, the capability request message 64 may simply indicate "3, 4" to identify that the data block 53 associated with the third capability ID, and the data block 54 associated with the fourth capability ID, are requested. Receipt of the capability request message 64 indicates that the data block(s) identified in the request message is not available to the access node 20.

In step 614 the UE 1 transmits data blocks corresponding to the capability IDs identified by said capability request message to the access node, in response to receiving the capability request message 64. In the provided example, the UE 1 transmits the third 53 and fourth 54 data blocks. Moreover, since the UE capability information has been divided into blocks, each identified data block 53, 54 is transmitted in a separate message 65 to the access node, hence the indication of two transmissions in the drawing.

In addition to the features related to the UE 1, a method is provided for use in an access node 20 for handling UE capability information in an access network 200 of a wireless communication system 40 including at least one UE 1. Specifically, the method relates to handling or accessing of UE capability information for a UE 1, related to which the access node 20 does not originally have access to the full UE capability information. It may thus be noted that the access node 20 may previously have transmitted to and/or received UE capability information from a core network node 120, or from other UEs, and the core network node may previously have transmitted to and/or received UE capability information from the access network 200. All or some of such previously received UE capability information may be stored in memory 28 in the access network 200, where it is made available to the access node 20. At some point, a UE 1 may register to the network to which the access node 20 belongs, or otherwise wants to update its capability status, and thereby transmits capability IDs.

In a step 605, the access node 20 receives, from the UE 1, a capability message 61 comprising one or more capability IDs 512,522,532,542, wherein each capability ID is associated with a corresponding data block 51-54 including a subset of the UE capability information of said UE 1. At least in the event the UE 1 registers to the network to which the access node 20 belongs, the capability message 61 preferably includes capability IDs corresponding to each data block of capability information for said UE 1.

In step 606, the access node 20 determines availability to the UE capability information corresponding to the received capability IDs, such as by accessing data memory 28. Typically, this may include the steps of searching for the received capability ID in a database of memory 28, and, responsive to finding the capability ID in the database, retrieving the associated subset of UE capabilities from the data block to which the capability ID corresponds, from the data memory 28. However, in the event one or more received capability ID is not available to the access node 20, this data must be obtained. This is preferably first 607 attempted from the core network 100, and secondly 612 from the UE 1.

In step 607 the access node 20 transmits a capability request message 62 to a different node in the wireless communication system, identifying the capability ID associated with at least one data block which is not available to the access node 20. As noted, this capability request message 62 may primarily be sent to the core network 100, such as core network node 120.

In step 611, the access node receives 611 said at least one data block from the core network node 120, provided it was available there.

Where the data block corresponding to each capability ID is not available in the access node 20 or obtained 63 from the core network node 120, the UE 1 itself is queried for the missing UE capability information:

In step 612 the access node 20 transmits a capability request message 64 to the UE 1, identifying the capability ID corresponding to the data block which is still not available to the access node 20.

In step 615, the data block still not available is received from the UE 1.

By this arrangement, data transmission over the air is minimized. First by checking locally stored data 28 first, and secondly attempting to obtain said data from the core network. Moreover, by dividing the UE capability information into data blocks, each transmission that s required to convey UE capability information for a certain UE is advantageously minimized, since many or all data blocks containing each one subset of UE capability information may already be available. Furthermore, if UE capability information contained in one block is missing, only the data of that block needs to be sent.

In step 616, the access node 20 may be configured to validate 616 data blocks received 615 by the UE 1 by
    calculating a capability ID based on each at least one received 615 data block using a predetermined function 55 for calculating capability IDs;
    comparing the calculated capability ID with the received capability ID of the capability message 61.

In step 617, the access node the access node 20 may transmit 617 any data block obtained 65 from the UE 1 to the core network node 120.

In addition to the features related to the UE 1 and the access node 20, a method is provided for use in a core network node 120 for handling user equipment, UE, capability information in a wireless communication system 40 including at least one UE 1 and an access network 200.

In a step 608, the core network node receives, from an access node 20 of the access network, a capability request message 62 comprising one or more capability IDs 512,522, 532,542, wherein each capability ID is associated with a corresponding data block 51-54 including a subset of the UE capability information of said UE 1.

In step 609, the core network node may determine availability of the UE capability information corresponding to the received capability IDs.

In step 610, the core network node may transmit all available data blocks corresponding to the received capability IDs to the access node 20.

In step 618, the core network node may receive, from the access node 20, all previously not available data blocks corresponding to the received capability IDs.

In step 619, the core network node may store 619 any data block received from the access node 20, e.g. in a data memory 128, where it is associated with the corresponding capability ID as received 608.

Figure 7:
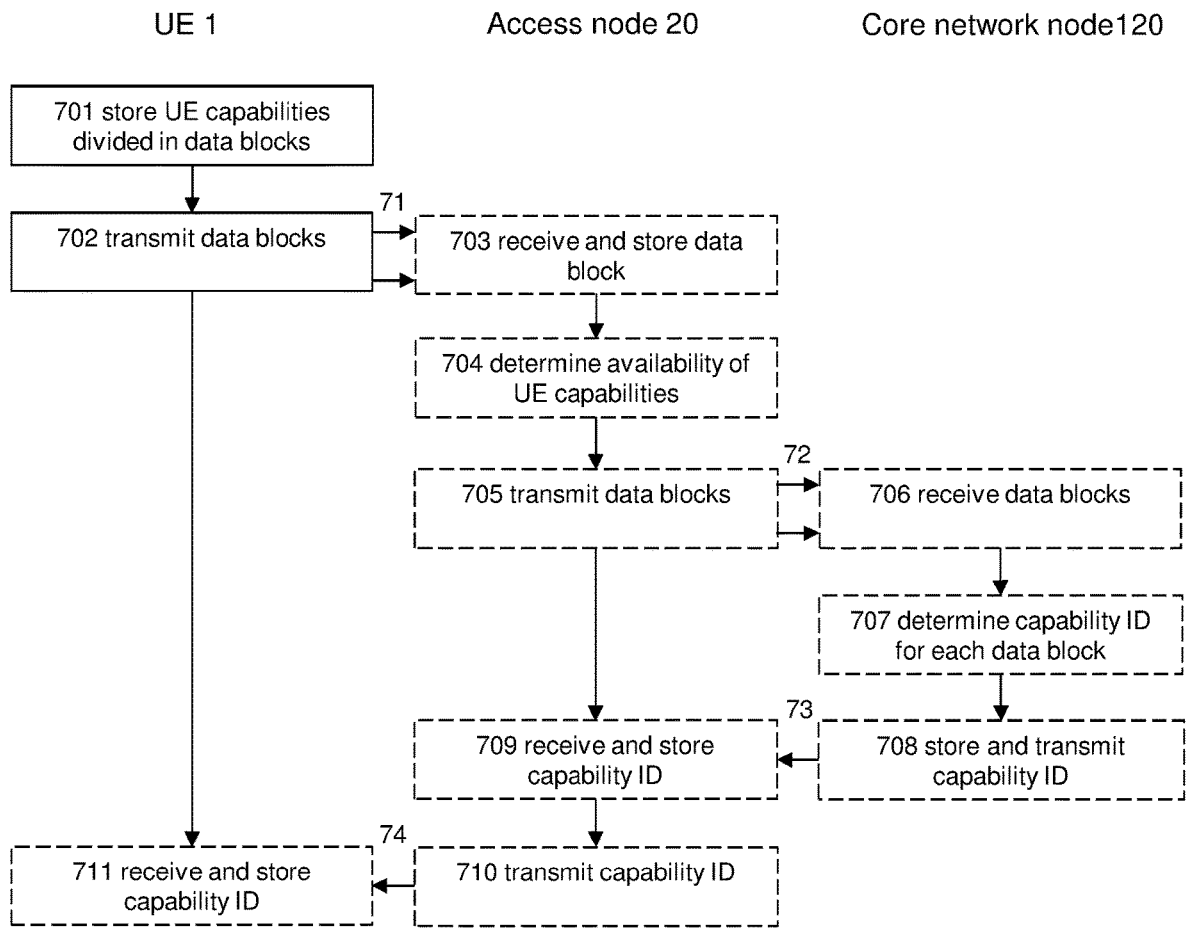
FIG. 7 shows a flow chart including several method steps carried out in various nodes in a wireless communication system, where different steps may be included in different embodiments as outlined in further detail below.

An alternative embodiment will now be described with reference to FIG. 7. From the perspective of the UE 1, a method is provided for use in the UE 1 for handling UE capability information in a wireless communication system 40 including an access network 200. The method comprises
storing 701 the UE capability information 50 divided into a plurality of data blocks 51-54, wherein each data block includes a subset of the UE capability information;
transmitting 702 at least one of said data blocks to the access network 200, wherein each block is transmitted in a separate message. Each block may be configured to have a maximum data size, according to any of the aforementioned principles.

In various embodiments, the UE may have stored capability ID for one or more of said data blocks, which capability ID may have been retrieved from the access network (200). In one embodiment, the UE 1 is configured to transmit the data blocks for which the UE 1 does not have a corresponding stored capability ID, i.e. each data block that has not been assigned a capability ID from the network. Moreover, the UE 1 may be configured to transmit all stored capability ID to the access network 200.

An access node 20 in the access network 200 which receives 703 the data blocks may determine availability 704 of the UE capabilities of the received data blocks and corresponding capability ID in the access node 20, and in turn transmit 705 the received data blocks 51-54 to a core network node 120 if they are not available. This transmission 72 too may be carried out with one data block per message 72 from the access node 20 to the core network node 120. The access node 20 may further store 703 any such data blocks previously not stored in in a memory 28.

In the core network node 120, the data blocks may be received 706. A capability ID 512,522,532,542 corresponding to each data block 51-54 may be determined 707, either as retrieved from a table, or newly determined if the data block is not previously known to the core network node 120. The capability ID can be any type of ID which is uniquely linked to the specific combination of data in a certain data block, such as in a lookup table stored in the core network 100. The core network node 120 may store 708 the determined capability ID 512,522,532,542 and transmit 708 it/them to the access network 200. The access node 20 receiving 709 determined capability ID 512,522,532,542 may store it/them 709 in the data memory 28. The access node 20 may further transmit 710 the determined capability ID 512,522,532,542 corresponding to each data block 51-54 to the UE 1, where said capability ID 512,522,532,542 may be received and stored 711 in memory 6.

When the UE 1 registers to a new network 200, it may transmit only the stored 711 capability ID 512,522,532,542 as outlined for previous embodiments. If the corresponding data blocks are available to the access node 20, as e.g. determined from a table associated with the memory 28, or the access node 20 is otherwise able to retrieve the data block from the core network 100, the UE 1 will not need to transmit such data blocks.

In a corresponding manner, if another UE 1' registers to the access network 200 and transmits 702 its data blocks containing subsets of its UE capability information, the access node 20 may determine 704 that it already possesses the corresponding capability ID 512,522,532,542 in memory 28, as received e.g. from the UE 1, and may transmit 711 that capability ID 512,522,532,542 to the UE 1' for storage and future use.

If the UE 1 makes a change in its UE capability information, such that one data block 51 is changed, then the UE must remove the associated capability ID. The UE 1 may thereby transmit 702 that changed data block to the access network 200. A process corresponding to what was just outlined may then be carried out for that changed data block, wherein the core network node 120 determines, stores and transmits a corresponding new capability ID 512.

The proposed solutions provide several benefits. Generally, the proposed solutions serve to minimize the amount of data that has to be transmitted between various nodes of a wireless communication system 40, for handling UE capability. Furthermore, it is possible to keep existing message size and fit single UE Radio capability block into each one message. In the event of e.g. a software upgrade with only few UE radio capabilities changed, then only the data block including the subset of UE capability information that has changed needs to be transferred and updated. This also allows a flexible solution that allows any implementation to add/change capabilities over time.

The proposed solutions also allow a UE 1 to control capability signaling, when it knows that all capabilities are not needed. The UE 1 may e.g. include a modem, comprising the logic 3, which is capable of and supports a large number of functionalities and has associated stored UE capability information. However, the UE 1 may be configured to be used through one or more applications, controlling the modem, which applications only employ one or a few functionalities of the total number of functionalities supported by the modem. This may be a temporary setting in the UE 1, or a permanent configuration. In such a scenario, the UE 1 need only send data blocks associated with the employed functionalities. Assume that the UE 1 is operated as an IoT device by a certain application in the UE 1, then there is no need to transmit UE capability information associated with e.g. voice-centric usage. The UE capability information of the employed functionalities may thus be provided in one, or potentially a few, data block 51, which is the only data block(s) the UE transmits 614, 702 to the access network 200. It is to be understood that the concepts as explained above are susceptible to various modifications. For example, the concepts could be applied in connection with various kinds of wireless communication technologies and devices. Further, the concepts may be applied in connection with various types of capabilities.

The invention claimed is:
1. A method for use in a user equipment (UE) for handling UE capability information in a wireless communication system including an access network, comprising:
storing the UE capability information divided into a plurality of data blocks, wherein each data block includes a subset of the UE capability information;
determining, for each data block, a corresponding capability ID;

transmitting a capability message to the access network, comprising at least one of the determined capability IDs.

2. The method of claim 1, wherein each capability ID is determined based on a device manufacturer specific code.

3. The method of claim 1, wherein each capability ID is determined based on the data of the associated data block.

4. The method of claim 1, wherein each capability ID comprises a hash value calculated using a predetermined function based on the data of the associated data block.

5. The method of claim 1, wherein each block has a predetermined common maximum data size, or
a data size not exceeding a predetermined number of octets.

6. The method of claim 1, wherein said capability message comprises the capability ID associated with each data block.

7. The method of claim 1, comprising:
receiving a capability request message from an access node of the access network, identifying at least one of said data blocks;
transmitting data blocks corresponding to the capability IDs identified by said capability request message to the access node in response to receiving the capability request message.

8. The method of claim 7, wherein each data block is transmitted in a separate message to the access node.

9. The method of claim 1, wherein at least one of said data blocks includes UE radio capabilities associated with a predetermined radio frequency, or
wherein at least one of said data blocks includes UE radio capabilities associated with a predetermined feature set of radio communication.

10. A method for use in an access node for handling user equipment (UE) capability information in an access network of a wireless communication system including at least one UE, comprising:
receiving, from said UE, a capability message comprising one or more capability IDs, wherein each capability ID is associated with a corresponding data block which represents a subset of the UE capability information of said UE.

11. The method of claim 10, comprising:
determining availability of the UE capability information corresponding to the received capability IDs;
transmitting a capability request message to a node in the wireless communication system, identifying the capability ID associated with at least one data block which is not available to the access node;
receiving said at least one data block from said node.

12. The method of claim 11, wherein said node is a core network node of the wireless communication system.

13. The method of claim 11, wherein said node is the UE.

14. The method of claim 13, comprising:
validating the at least one data block by
calculating a capability ID based on each at least one received data block using a predetermined function for calculating capability IDs;
comparing the calculated capability ID with the received capability ID of the capability message.

15. The method of claim 11, wherein transmitting the capability request message includes:
transmitting a first capability request message to a core network node of the wireless communication system; and, responsive to not receiving said at least one data block from the core network node,
transmitting a second capability request message to the UE.

16. The method of claim 11, wherein each capability ID is determined based on the data of the associated data block, or
wherein each capability ID is a hash value calculated using a predetermined function based on the data of the associated data block.

17. The method of claim 11, wherein each block has a predetermined common maximum data size, or
wherein each block has data size not exceeding a predetermined number of octets.

18. The method of claim 11, wherein said capability message comprises the capability ID associated with each data block.

19. A method for use in a core network node for handling user equipment (UE) capability information in a wireless communication system including at least one UE and an access network, comprising:
receiving, from an access node of the access network, a capability request message comprising one or more capability IDs, wherein each capability ID is associated with a corresponding data block including a subset of the UE capability information of said UE.

20. The method of claim 19, comprising
determining availability of the UE capability information corresponding to the received capability IDs;
transmitting all available data blocks corresponding to the received capability IDs to the access node;
receiving, from the access node, all previously not available data blocks corresponding to the received capability IDs, and
storing the received data blocks.

* * * * *